United States Patent [19]

Booker

[11] Patent Number: 5,232,259

[45] Date of Patent: Aug. 3, 1993

[54] TRUCK BED AIR DEFLECTING TOOL BOX

[76] Inventor: Robert F. Booker, 1796 Old Buckroe Rd., Hampton, Va. 23664

[21] Appl. No.: 944,287

[22] Filed: Sep. 14, 1992

[51] Int. Cl.[5] .............................................. B60R 9/06
[52] U.S. Cl. ................................ 296/37.6; 296/180.1; 224/42.42; 269/901
[58] Field of Search ................... 296/37.6, 180.1, 57.1; 312/DIG. 33; 224/42.42; 269/296, 16, 901

[56] References Cited

U.S. PATENT DOCUMENTS

| | | | |
|---|---|---|---|
| 4,752,095 | 6/1988 | Brady | 296/37.6 |
| 4,789,195 | 12/1988 | Fletcher | 296/37.6 |
| 5,083,829 | 1/1992 | Fonseca | 296/37.6 |
| 5,088,636 | 2/1992 | Barajas | 296/37.6 X |
| 5,169,202 | 12/1992 | Cupp et al. | 296/57.1 X |

Primary Examiner—Joseph D. Pape
Attorney, Agent, or Firm—Leon Gilden

[57] ABSTRACT

A tool box is arranged for mounting onto a truck bed floor coextensively between side walls thereof in adjacency to an associated tailgate of a truck bed. The tool box includes a cavity therewithin, with a top wall mounted to each hypotenuse of each side wall of the housing. The top wall accordingly is canted from the floor upwardly to an upper end of the tailgate when the tailgate is in a secured orientation relative to the truck bed. The tool box housing is arranged to include various support doors as required as used for storage of various tools and the like therewithin.

2 Claims, 4 Drawing Sheets

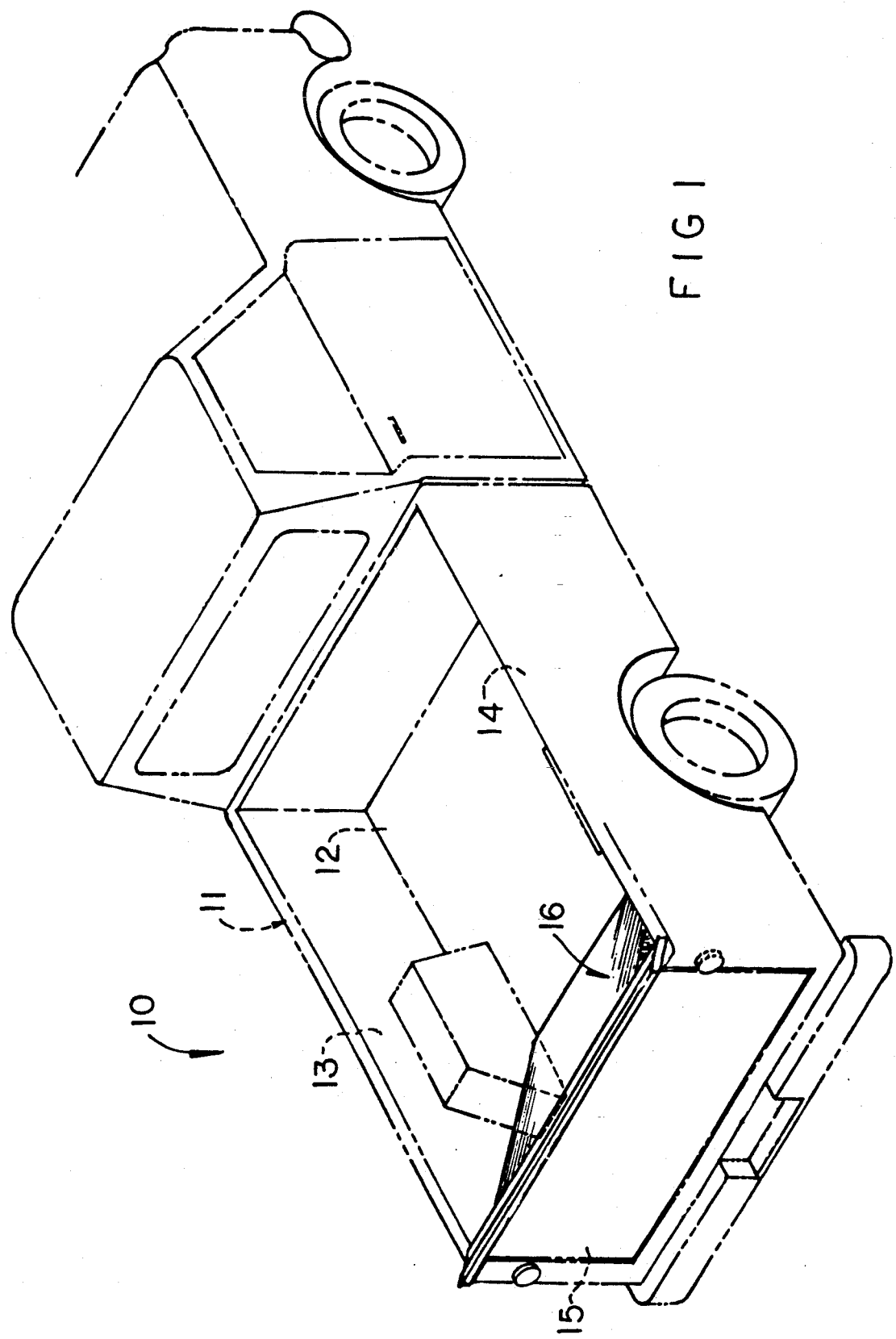

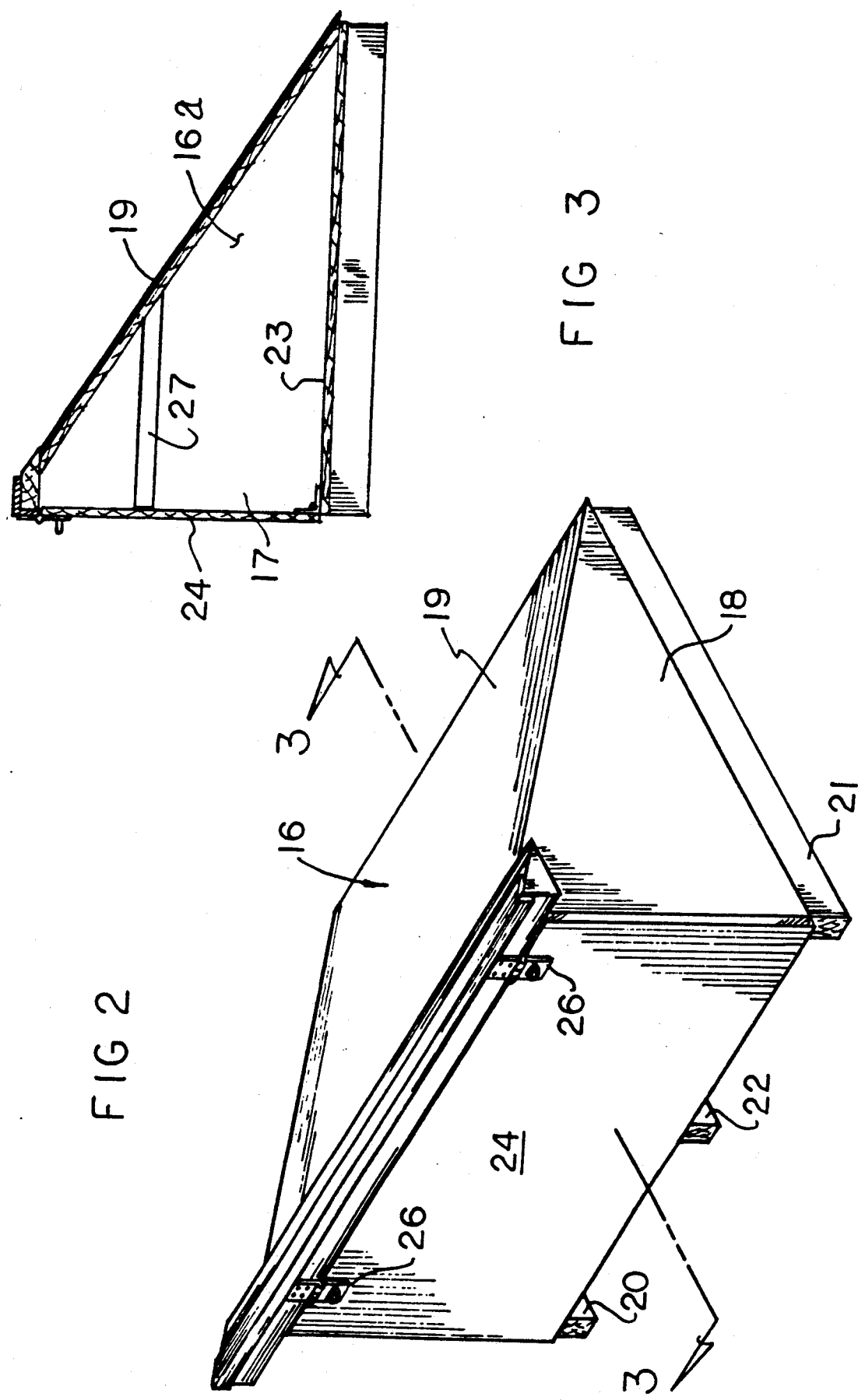

TRUCK BED AIR DEFLECTING TOOL BOX

BACKGROUND OF THE INVENTION

1. Field of the Invention

The field of invention relates to tool box apparatus, and more particularly pertains to a new and improved truck bed air deflecting tool box wherein the same is arranged to deflect air minimizing its imposing upon a tailgate of an associated truck bed.

2. Description of the Prior Art

Tool boxes of various types for storage within truck beds are typically utilized, however the conventional tool boxes are mounted in adjacency to a truck cab of an associated truck, wherein air currents directed through the truck bed are free to impose on an associated tailgate to effect wind drag relative to a truck bed. Such prior art tool box structure is exemplified in U.S. Pat. Nos. 3,640,423; 4,789,195; and 4,936,624.

The instant invention attempts to address such deficiencies of the prior art by providing for a tool box structure arranged for mounting in adjacency to a truck tailgate to deflect air relative to the tailgate to minimize wind drag within the truck bed and in this respect, the present invention substantially fulfills this need.

SUMMARY OF THE INVENTION

In view of the foregoing disadvantages inherent in the known types of tool box apparatus now present in the prior art, the present invention provides a truck bed air deflecting tool box wherein the same is arranged for mounting in adjacency relative to a tailgate of an associated truck bed. As such, the general purpose of the present invention, which will be described subsequently in greater detail, is to provide a new and improved truck bed air deflecting tool box.

To attain this, the present invention provides a tool box arranged for mounting onto a truck bed floor coextensively between side walls thereof in adjacency to an associated tailgate of a truck bed. The tool box includes a cavity therewithin, with a top wall mounted to each hypotenuse of each side wall of the housing. The top wall accordingly is canted from the floor upwardly to an upper end of the tailgate when the tailgate is in a secured orientation relative to the truck bed. The tool box housing is arranged to include various support doors as required as used for storage of various tools and the like therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck bed air deflecting tool box.

It is another object of the present invention to provide a new and improved truck bed air deflecting tool box which may be easily and efficiently manufactured and marketed.

It is a further object of the present invention to provide a new and improved truck bed air deflecting tool box which is of a durable and reliable construction.

An even further object of the present invention is to provide a new and improved truck bed air deflecting tool box which is capable of a low cost of manufacture with regard to both materials and labor, and which accordingly is then capable of low prices of sale to the consuming public, thereby making such truck bed air deflecting tool boxes economically available to the buying public.

Still yet another object of the present invention is to provide a new and improved truck bed air deflecting tool box which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the tool box housing of the invention.

FIG. 3 is an orthographic view, taken along the lines 3—3 of FIG. 2 in the direction indicated by the arrows.

DESCRIPTION OF THE PREFERRED EMBODIMENT

Figure 4:
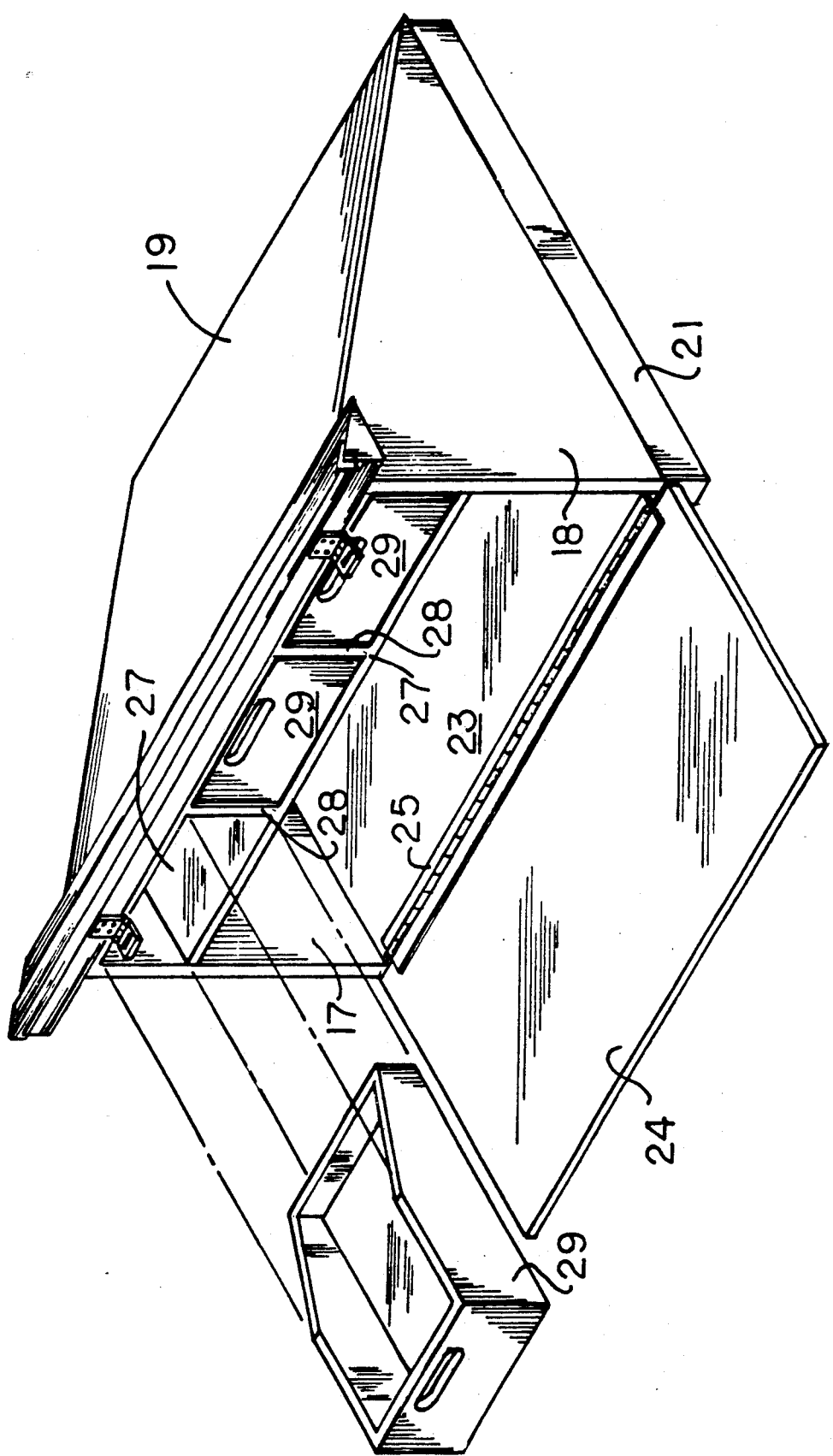
FIG. 4 is an isometric illustration of the invention employing a plurality of storage cabinetry therewithin.

With reference now to the drawings, and in particular to FIGS. 1 to 5 thereof, a new and improved truck bed air deflecting tool box embodying the principles and concepts of the present invention and generally designated by the reference numeral 10 will be described.

More specifically, the truck bed air deflecting tool box 10 of the instant invention essentially comprises a combination with a truck bed 11 having a truck bed floor 12, and respective first and second truck bed side walls 13 and 14 spaced apart a predetermined spacing. A truck bed tailgate 15 hingedly mounted to the truck bed floor 12 is positioned on the truck bed 11 in a conventional relationship. The tool box housing 16 is mounted to the truck bed floor 12 in adjacency to the tailgate 15, with the truck bed housing 16 having housing right triangular first and second side walls 17 and 18 substantially spaced apart by the predetermined spacing in adjacency to the respective truck bed first and second side walls 13 and 14. A housing floor 23 is provided, with the housing first and second side walls 17 and 18 orthogonally extending upwardly on opposed sides of the housing floor 23. A respective first and second skid rail 20 and 21 are mounted in a parallel and coextensive relationship below the housing floor 23 underlying the respective housing first and second side walls 17 and 18. If required, a medial skid rail 22 parallel to and intermediate the first and second skid rails 20 and 21 is mounted below the housing floor 23. A housing top wall 19 is provided and fixedly mounted to each hypotenuse of the housing right triangular first and second side walls 17 and 18, with the top wall 19 canted upwardly from the truck bed floor 12 extending to an upper end of the tailgate 15 when the tailgate is in a secured orientation relative to the truck bed 11. A housing door 24 is provided having a housing door hinge 25 that hingedly mounts the housing door 24 to the housing floor 23. Housing door latches 26 secured to the housing door 24 and the housing top wall 19 permit selective locking of the housing door to the housing 16. The housing top wall is formed of ample structural rigidity to accommodate significant load imparted thereon. Such construction to include a resistant outer skin for positioning articles thereon. The top wall itself is to be constructed of such materials as plywood, steel, etc. to maintain rigidity and geometric integrity. Further, reinforcing at the intersection of the top wall with the door 24 may include an outer steel layer at that corner to accommodate impact. In this manner, a housing cavity 16a is defined within the tool box housing 16 between the top wall, floor, and door extending between the side walls 17 and 18. The side walls 17 and 18 are to be recessed or notched as required to accommodate a vehicle's wheel wells to coextensively orient the tool box structure between side walls of the truck bed. There should accordingly be no air gap between side walls of the tool box and the truck bed side walls.

The FIG. 4 illustrates the use of a shelf floor 27 oriented parallel to and above the housing floor 23. Partition walls 28 are orthogonally mounted to the shelf floor 27 extending between the shelf floor 27 and the housing top wall 19, with a plurality of slide drawers 29 slidably mounted on the shelf floor 27 between the shelf floor and the housing top wall on opposed sides of the partition walls 28 for storage of various components therewithin.

Figure 5:
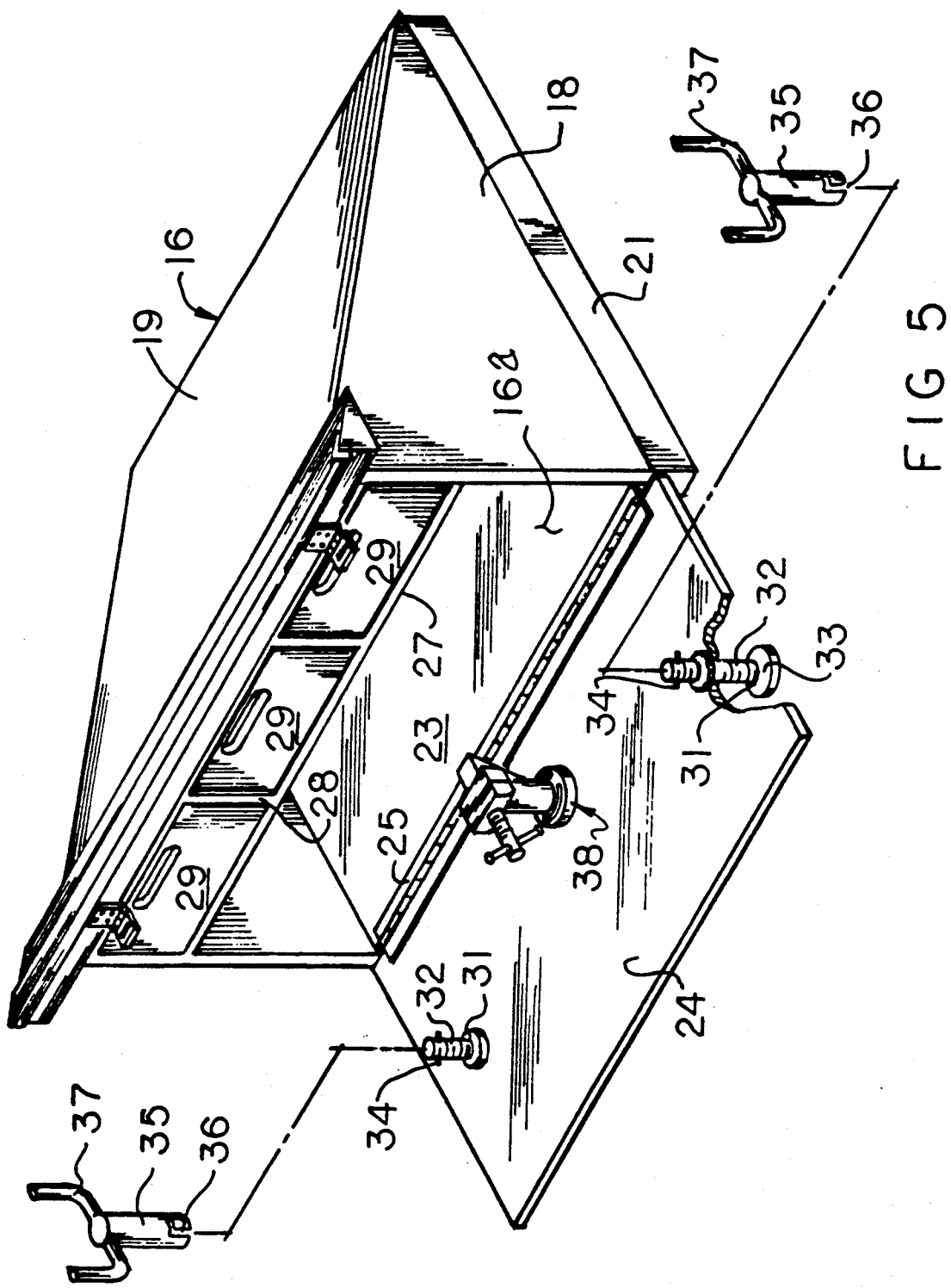
FIG. 5 is an isometric illustration of the invention utilizing positioning feet relative to the door of the tool box housing for operative positioning and mounting of workpieces relative to the housing door member.

The FIG. 5 of the invention provides for a work station mounted to the housing door 24. A plurality of internally threaded bosses 31 are spaced apart and fixedly secured to the housing door, having each an externally threaded positioning rod 32 extending therethrough. A lower terminal end of each positioning rod includes a magnetic foot pad 33. The magnetic foot pad 33 is arranged for abutment to the metallic truck bed tailgate 15, whereupon opening of the gate 15 permits automatic opening of the housing door 24 when the housing door 24 is in an unsecured relationship relative to the housing 16. An upper distal end of each positioning rod 32 includes a plurality of latch rods 34 extending diametrically through each positioning rod in diametrically oriented orientation on opposed sides of each positioning rod. A plurality of support tubes 35 are provided. Each support tube includes a plurality of L-shaped support tube slots 36 directed into the support tube adjacent its lower distal end for receiving the latch rods 34 to secure each support tube 35 to an associated positioning rod 32. An upper distal end of each support tube 35 includes a U-shaped support 37. The U-shaped supports 37 are arranged for and in aligned orientation to position a pipe member and the like thereon as a workpiece support. Further, the positioning rods 32 are adjusted to provide for a leveling of the housing door 24 when opened relative to an associated tailgate as the magnetic foot pads 33 assist in positioning the U-shaped supports 37 relative to the positioning rods in a predetermined orientation relative to one another. A vise member 38 is also provided and mounted to an interior surface of the housing door, with the vise member 38 received within the cavity 16a when the door 24 is directed onto the tool box 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In combination a truck bed air deflecting tool box, and a truck bed
   the truck bed having a truck bed floor, with a truck bed first side wall spaced from a truck bed second side wall by a predetermined spacing, and
   a tailgate hingedly mounted to the truck bed floor pivotal from a first position orthogonally oriented to the truck bed floor to a second position arranged substantially parallel to the truck bed floor, and wherein the tool box comprises, a tool box housing positioned on the truck bed floor, with the tool box housing including a housing floor, a housing first side wall and a housing second side wall arranged in a parallel coextensive relationship relative to one another substantially spaced apart by the predetermined spacing in adjacency to the respective truck bed first and second side walls, and a housing top wall mounted to the housing first side wall and the housing second side wall, and a housing door, the housing door including a door hinge, with the door hinge mounted to the housing door and to the housing floor to hingedly mount the housing door to the housing floor permitting selective displacement of the housing door relative to the tool box housing, wherein a housing cavity is defined within the tool box housing above the floor and below the housing top wall between the housing first side wall and the housing second side wall, and the housing first side wall and the housing second side wall are each of a right triangular configuration, with the housing first side wall including a first hypotenuse edge and the housing second side wall including a second hypotenuse edge, with the housing top wall mounted coextensively to the first hypotenuse edge and the second hypotenuse edge, with the housing top wall canted from the housing floor upwardly thereof to a position in adjacency to an upper edge of the truck bed tailgate when the tailgate is in the first position, and the housing floor includes a bottom surface, and the bottom surface includes a first skid rail and a second skid rail mounted in a coextensive and parallel relationship, with the first skid rail and the second skid rail parallel to the truck bed first side wall and the truck bed second side wall, and the housing door includes latch means for selective securement of the housing door to the tool box housing, and a shelf floor within the housing cavity, with the shelf floor arranged parallel to and above the housing floor, and a plurality of partition walls orthogonally mounted to the shelf floor extending between the shelf floor and the housing top wall, and a plurality of slide drawers slidably mounted on the shelf floor between the shelf floor and the housing top wall on opposed sides of the partition walls, and a plurality of positioning rods orthogonally and adjustably directed through the housing door, each positioning rod includes a positioning rod lower distal end oriented exteriorly of the tool box housing, with each positioning rod lower distal end having a magnetic foot pad arranged for magnetic adherence to the truck bed tailgate, and a positioning rod upper distal end, with each positioning rod upper distal end including a plurality of latch rods diametrically and orthogonally directed through a respective positioning rod, and a plurality of support tubes, each support tube having a plurality of L-shaped support tube slots arranged for receiving the latch rods of one of said positioning rods, and each support tube includes a U-shaped support spaced from the L-shaped slots.

2. A truck bed air deflecting tool box as set forth in claim 1 including a vise member mounted to the housing door in adjacency to the door hinge for positioning of the vise member within the housing cavity when the housing door is secured to the tool box housing.

* * * * *